Nov. 24, 1925.

B. H. BLAKE

PISTON RING

Filed Dec. 10, 1924

1,562,613

Inventor
Belden M. Blake
By N.L.&A.L. Reynolds
Attorneys

Patented Nov. 24, 1925.

1,562,613

UNITED STATES PATENT OFFICE.

BELDEN H. BLAKE, OF CLEVELAND, OHIO.

PISTON RING.

Application filed December 10, 1924. Serial No. 754,994.

*To all whom it may concern:*

Be it known that I, BELDEN H. BLAKE, a citizen of the United States of America, and resident of the city of Cleveland, in Cuyahoga County, State of Ohio, have invented certain new and useful Improvements in Piston Rings, of which the following is a specification.

My invention relates to piston rings such as are intended to be employed in and especially adapted to high speed, high pressure internal combustion engines, such as present automobile engines.

One of the chief objects of my invention is the elimination of as much friction as possible, both between the ring and the ring grooves and between the ring and the cylinder walls.

A further object is the provision of a ring which will quickly and readily seat itself in ring grooves of varying thickness, whether old or new, to worn cylinders, and which will maintain automatically the proper seating and pressure both against the cylinder walls and against the sides of the ring groove, to the ends of preventing escape of pressure and of preventing access of too much oil to the combustion chamber.

In general it is my object to provide a ring which will adapt itself to the varying conditions met with in different motors, maintaining at all times a proper and tight seal which will prevent the passage of too great an amount of oil into the combustion chamber, but which will permit the passage of sufficient oil for proper lubrication.

My invention is embodied in a ring of more than one section, preferably two complemental sections, and has for a further object the provision of a spring for use in connection with such a two-section ring, and the construction of a ring to cooperate with the spring, whereby the spring cannot improperly engage the ring sections but will cooperate therewith at all times to cause the ring to properly conform in contour to the wall of the cylinder.

A further object in connection with such a two-section ring is the provision of means whereby the two rings may work relative to each other to conform to the cylinder wall and ring groove with a minimum of friction between the two sections.

In the accompanying drawings I have shown a preferred embodiment of my invention and have shown also the manner in which it adapts itself to varying conditions.

Figure 1:
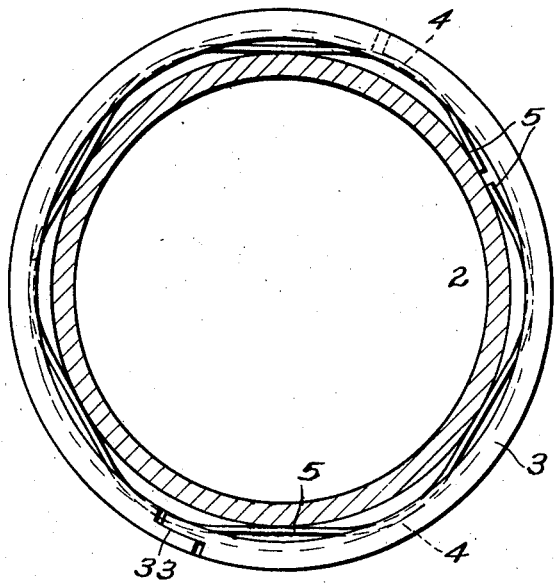
Figure 1 is a section taken transversely of a piston through a groove containing my improved ring.

The piston rings ordinarily seated in the circumferential ring grooves of the pistons of internal combustion engines, particularly, and other engines as well, are intended primarily to seal the clearance space between the piston and cylinder wall to prevent leakage of pressure therepast, and secondarily are intended to prevent the access of too great a quantity of lubricating oil past the piston and into the combustion chamber, although enough should be admitted to provide proper lubrication for the piston rings. Such rings must, therefore, not press so heavily outward or be of such shape that they will prevent the adhesion of a slight film of oil on the cylinder walls; they should not press outward so loosely that too great a quantity of oil is permitted to pass either about the entire circumference of the cylinder or in spots, and they should at all times conform to the cylinder wall, although its contour be irregular, and to the ring grooves so as to prevent leakage of oil and of pressure between the piston rings and its groove. The cylinder walls after use become worn and distorted, as do the ring grooves, and it is almost invariably the case with ordinary rings that after considerable use of the motor the ring, though it may have fitted properly and have produced a satisfactory degree of sealing when first installed, does not properly seal the space between the piston and cylinder walls or does not properly seal the ring groove after such use. In cylinders which have become tapered in use, also, and especially at high speeds, the ring may properly seal the clearance at the small end of the cylinder, but at the larger end, because of the high piston speed, it may not have had time to expand to produce the proper seal. Hence leakage of pressure and pumping of oil results.

Attempts have been made heretofore to provide piston rings formed in sections which wedge together and thus force each other outward and against the sides of the ring groove. Such rings have been moderately satisfactory but not entirely so, for the reason that they do not readily adapt themselves to slight variations in size and cannot be made sufficiently accurate to accommodate them when first installed, and further, as made heretofore they produce an objectionable degree of friction between the parts of the ring itself and between the ring and the groove and cylinder wall. According to my invention I employ a two-section ring, the two sections being shaped to wedge each other outward against the sides of the ring groove and against the cylinder wall to produce proper sealing at these two points, yet so arranged that the outward pressure is never so great as to scrape the walls bare of lubricant, and so formed that the amount of friction between the ring and the cylinder wall and the ring groove, and between the two sections of the ring itself, is reduced to a minimum, all without affecting the proper sealing of the clearance space.

In the drawings the cylinder wall 1 is shown as spaced slightly from the periphery of the piston 2. The piston is provided with ring grooves, of which a single groove 21 only is shown, within which the piston ring fits. It will be understood that it will generally be desirable to employ other piston rings, chiefly because my ring is not intended, nor adapted, to receive the force and temperatures generated by explosion in high pressure internal combustion engines, but as the chief function of this ring is to provide proper sealing with sufficient lubrication and to prevent pumping of oil, it will be understood that any other suitable form of piston ring, and as many thereof or as few as may be found desirable, may be employed in connection therewith. It should be understood, further, that in order to properly seal the space between the cylinder wall 1 and the piston 2 the piston ring must fit the cylinder properly at all points, and must also press against the side walls 22 and 23 of the ring groove 21. While I prefer that my ring should be formed in two complemental sections, additional sections may be employed if this is deemed desirable. I shall describe herein a two-section ring, it being obvious how additional sections may be employed if necessary.

The section 3, which for convenience may be designated the upper section, is provided with a lower beveled surface 30 which cooperates with an upper beveled surface 40 formed upon the lower ring 4. It will be noted, however, that the angles of the surfaces 30 and 40 do not exactly coincide but diverge somewhat so that the two faces meet only along a restricted area, practically a knife edge, at the outermost edges of the two sections. By this means wear of the two sections, one over the other, is reduced to a minimum, and greater freedom of action is permitted the two sections as they pass over inequalities or distortions of the cylinder walls.

The surface 31 of the upper ring which contacts with the cylinder wall 1 is rather narrow as compared with the total width of the ring groove 21. This will permit rapid wear from the face 31 where this is necessary or desirable. It will be noted, also, that the outer periphery of the ring section 4 does not contact along a cylindrical surface with the cylinder wall 1, but is beveled, as indicated at 41, so that its upper edge only touches the cylinder wall. In the ideal condition illustrated in Fig. 2, both the surface 31 and the upper edge of the beveled surface 41 touch the cylinder wall 1 and press equally thereagainst. This condition will obtain where the width of the composite ring corresponds exactly to the width of the ring groove 21, or after the ring has seated itself by wearing into place, as is explained hereinafter.

It will be understood that the ring sections 3 and 4 are inherently somewhat resilient and press outward. They are also of sufficiently slight cross sectional area and formed of such metal as will permit them to press outward and conform to irregularities and to any distortion of the cylinder wall. The inherent resilience of the sections may be sufficient to hold them outwardly against the cylinder wall, or it may be desirable to provide a spring 5 which is placed in the bottom of the ring groove and which fits against the rear or inner face 45 of the section 4 to press this section outwardly.

By reason of the beveled meeting faces between the sections 3 and 4, outward pressure of or upon the section 4 will tend to force the section 3 outward and will tend to force each section against the adjacent side wall of the ring groove, the section 3 against the wall 23 and the section 4 against the wall 22. It is this action which produces proper sealing of the ring within its groove, which produces the outward pressure to seal the ring against the cylinder wall and which prevents admission of oil into the ring groove past the ring, or past the ring in the clearance space.

It will be noted, too, that the inner edge of the upper section 3 extends inward considerably beyond the inner face 45 of the section 4 and is never enabled to bear directly against the section 3, for any tendency of the spring to engage the section 3 would only cause it to slide over the inclined face 30 to its proper position in contact with the face 45. The face 41 of the section 4 will wear somewhat more rapidly than the face 31 of the section 3 in ordinary service, hence there will never be any danger of wear bringing the inner edge of the section 3 into such a position that it may be engaged and pressed outward by the spring 5. Thus all outward pressure against the section 3 can only come through the outward pressure of the section 4 acting between the cooperating inclined faces 40 and 30.

Figure 2:
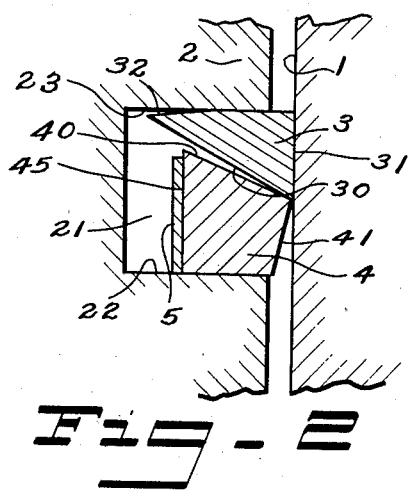
Figure 2 is a longitudinal section through the piston and cylinder wall and the ring groove, showing the ideal condition in which the ring sections tightly seal the space between piston and cylinder and also tightly seal the ring groove itself.
Figure 4:
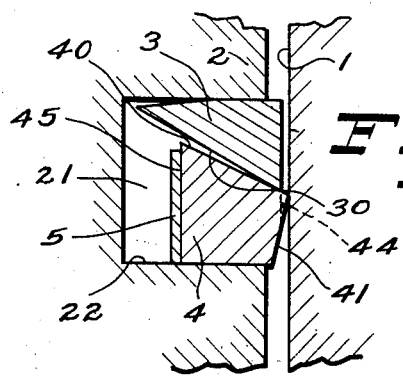
Figure 4 is a similar section showing a ring of slightly less width than the ideal, these two views illustrating the manner in which such rings adapt themselves and produce a proper seal.

While the ideal condition is illustrated in Figure 2, this is seldom attainable except by accident, for the reason that mechanical imperfections and inaccuracies in the lathes upon which the rings are turned render it impossible to form such a composite ring of a width exactly corresponding to the ring groove for which it is intended, within perhaps .002 of an inch. It is not desirable to have only a line contact between the ring and the cylinder wall, as is indicated in Figure 4, and this condition would be present if the composite ring were undersize or if the ring groove were oversize, as is generally the case in used motors.

This is not fatal with my ring, however, but on the contrary the ring is especially designed to adapt itself to such oversize ring grooves. The beveled surface 41, which purposely meets the cylinder wall at a knife edge, will rapidly wear down until the sections 3 and 4 bear equally against the cylinder wall. The line of wear is indicated on the ring 4 in Figure 4 by the dotted line 44. It has been my experience that even in the most extreme cases of oversize ring grooves my ring will wear down to a proper seat with both sections 3 and 4 pressing equally against the cylinder wall, within one hundred miles of travel of the car driven by such motor.

Figure 3:
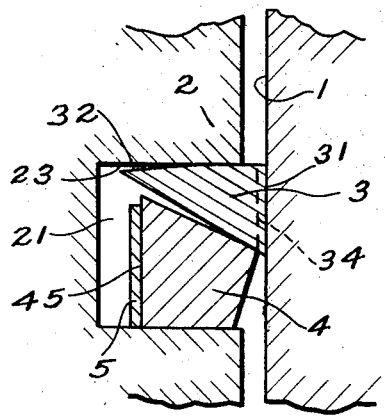
Figure 3 is a section similar to Figure 2, showing rings of slightly greater width than is required under ideal conditions.

In order to avoid the ring being undersize and having to wear first from the ring 4, it is generally the practice to make the composite ring slightly oversize, perhaps .002 of an inch, which will permit variations between the ideal, where the ring is exactly of the width of the ring groove when in the relation shown in Figure 2, and an oversize width of .004 of an inch. In such oversize condition the ring 3 extends slightly beyond the outermost edge of the ring 4, but by reason of the beveled meeting faces of the ring sections the rings even so seat themselves within the ring groove and press the section 3 outward against the cylinder wall. However, as the outer or bearing surface 31 of the section 3 is narrow it will wear down rapidly to the line 34 shown on Figure 3, whereupon the parts will assume the ideal relation shown in Figure 2 with both sections bearing equally against the cylinder wall 1.

It will be understood from the above description that if one ring should tend to wear more than the other, an undersize or an oversize condition will be brought about and the ring will thereupon readapt itself and resize itself to produce again the ideal condition. Actually such wear and adapting is going on continually, but the sections remain almost exactly in the ideal condition of equilibrium where both sections are pressed against their adjacent side walls of the ring groove and the section 3 presses against the cylinder wall, the outer edge only of the section 4 likewise pressing against the cylinder wall and the two sections bearing along the outermost portions only of their beveled meeting faces 30 and 40. In this condition the ring groove and the space between the piston and cylinder wall are properly sealed against pressure and against oil. The sections are free to work one over the other and the friction between the ring sections and between the ring and the cylinder walls and ring groove is reduced to a minimum.

I have shown and described the sections 3 and 4 as ordinarily split rings, and while any form of joint for the two ends thereof may be employed, it is my intention to use a step-cut joint, as illustrated at 33 (Figure 1), which will prevent leakage though the ring may wear to a considerable extent. It should be remembered too, that it is within the scope of my invention to divide either or both of the sections 3 or 4, or the spring 5, into segments. The manner in which this may be done is well-known in the art and such segmental rings or sections are deemed to be the full equivalent of my invention as shown and described herein.

By reason of the slight surfaces of contact between the ring sections and between the ring and cylinder wall, the ring in a very short time will wear itself to a proper seat, but thereafter the slight contact at these points will diminish friction and consequently the wear on the ring and cylinder wall and the life of both is therefore prolonged. It is prolonged also by reason of the fact that the rings are not shaped in such manner as to scrape lubricating oil from the cylinder walls, though they will press outward sufficiently and evenly throughout their circumference to prevent more than sufficient lubricating oil to cling to the cylinder walls. Also, by reason of the narrow meeting edges and rapid wear in seating itself, these meeting edges will cooperate more perfectly to form a proper seal which will endure throughout the life of the piston and which will better hold compression. The ring adapts itself and sizes itself automatically to ring grooves of considerably different widths and to cylinders varying considerably in diameter and degree of distortion, hence it obviates the necessity of manufacturing and carrying in stock rings of slightly different widths and diameters, commonly known as oversize rings, and greatly simplifies and standardizes manufacture and distribution of the rings. As the rings will automatically and in a very short time adapt themselves perfectly to their seat, it is unnecessary for the mechanic who installs them to file them or otherwise attempt to shape them to fit, saving his time and producing a better job.

Figure 5:
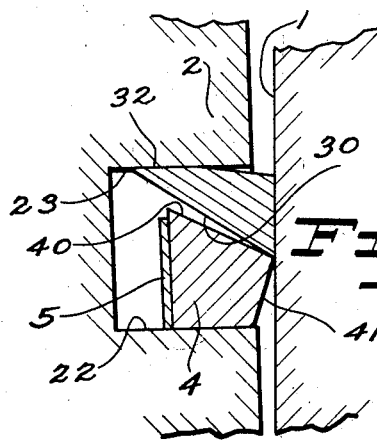
Figure 5 is a section similar to Figure 2, showing the manner in which the rings adapt themselves to tapered cylinders and to pistons which are cocked slightly askew in the cylinder.

The side face of the upper section 3 which lies adjacent the wall 23 of the ring groove, may be relieved slightly as indicated at 32, inward of the outer edge of the wall 23. This may be desirable for some installations and not for others. The triangular cross sectional shape of the section 3, together with the relieving of the inner portion of both the side and inner faces of this section, permits this section, if made from a suitably flexible material, to twist and rock as will be required if the cylinder wall has been worn or if the piston, through the action of the explosion or because of the influence of bent connecting rods or for other reasons is permanently or temporarily cocked or moved from exact axial alinement with the cylinder. Such a condition is shown in Figure 5. When the piston is cocked out of alinement, the outer face 31 of the section 3 still remains in proper contact with the cylinder wall 1, as does the edge of the section 4, yet the sections are permitted to rock along their meeting faces, these faces being relieved as described above, and the section 3 will rock to bring its relieved face 32 into contact with the side wall 23 of the ring groove, thus maintaining a perfect fit without an increase in friction.

What I claim as my invention is:

1. A composite piston ring comprising an upper ring section having a beveled lower face, a lower ring section having a beveled upper face, said two beveled faces being of unlike angle and meeting along their outer edges.

2. A composite piston ring comprising an upper ring section having a beveled lower face, a lower expansible ring section having a beveled upper face cooperating with the beveled face of the upper section to force the latter outward and to force both sections against the adjacent side walls of the piston ring groove, said beveled faces being of unlike angle to bear only along their outer edges.

3. A composite piston ring comprising an upper ring section having a beveled lower face, a lower expansible ring section having a beveled upper face cooperating with the beveled face of the upper section to force the latter outward and to force both sections against the adjacent side walls of the piston ring groove, said beveled faces being of unlike angle to bear only along their outer edges, and the outer face of said lower section being relieved to bear against the cylinder wall only along its upper edge.

4. A composite piston ring composed of two sections having beveled contacting faces of slightly differing angles positioned to contact said faces only along their outer edges.

5. A composite piston ring comprising one ring section having the inner edge of the face which contacts with the side wall of the piston ring groove relieved, and having a face opposite said wall-contacting face beveled, and a complemental ring section having a beveled surface cooperating with the beveled surface of the first section, the angle of bevel of the second section being less acute with respect to the cylinder wall than that of the first section.

6. A composite piston ring comprising one ring section of triangular cross section having the inner edge of the face which contacts with the side wall of the piston ring groove relieved, and a complemental ring section having a beveled surface cooperating with the beveled surface of the first section, the angle of bevel of the second section being less acute with respect to the cylinder wall than that of the first section, the angle of bevel of the contacting faces of the two sections being unlike sufficiently to slightly separate the inner edges of the two sections.

7. A composite piston ring comprising one ring section of triangular cross section having the inner portion of the face which contacts with the side wall of the piston ring groove relieved, and a complemental ring section having a beveled surface cooperating with the beveled surface of the first ring, the beveled surfaces of the two rings being at unlike angles which cause engagement towards their outer edges.

Signed at Cleveland, Cuyahoga County, Ohio, this 15th day of November, 1924.

BELDEN H. BLAKE.